United States Patent [19]
Pilarski

[11] 3,981,052
[45] Sept. 21, 1976

[54] LOW FRICTION GUIDE LOOP
[75] Inventor: Regis Victor Pilarski, Utica, Mich.
[73] Assignee: The Firestone Tire & Rubber Company, Akron, Ohio
[22] Filed: July 23, 1975
[21] Appl. No.: 598,208

[52] U.S. Cl. .............................. 24/163 R; 24/193; 297/389
[51] Int. Cl.² .................... A44B 11/12; B60R 21/10
[58] Field of Search ................. 24/193, 163 R, 170, 24/196, 197; 280/150 SB; 297/388, 389

[56] References Cited
UNITED STATES PATENTS

| | | | |
|---|---|---|---|
| 2,071,903 | 2/1937 | Shively | 297/388 UX |
| 2,622,293 | 12/1952 | Wermlinger | 24/170 |
| 3,428,362 | 2/1969 | Bertelson et al. | 280/150 SB X |
| 3,695,697 | 10/1972 | Stoffel | 297/389 |
| 3,719,972 | 3/1973 | Klink | 24/193 |
| 3,725,982 | 4/1973 | Fisher | 24/196 |
| 3,877,114 | 4/1975 | Silen | 24/163 R |

FOREIGN PATENTS OR APPLICATIONS

| | | | |
|---|---|---|---|
| 305,138 | 10/1968 | Sweden | 280/150 SB |
| 244,408 | 4/1947 | Switzerland | 24/193 |

*Primary Examiner*—Donald A. Griffin
*Attorney, Agent, or Firm*—Miller, Morriss and Pappas

[57] ABSTRACT

An integrally formed low friction anchor ring guide having a flat anchor tab upper end portion with an anchor bolt opening therethrough, a transversely bent central portion having a seat belt webbing slot with curved end portions, and a lower rolled end portion aligned with the webbing slot so that tangential entrainment of seat belt webbing occurs over the rolled portion as the webbing passes through the webbing slot. A tension stop lock-out block may be pivotally secured to the rolled end portion of the ring guide. The tension stop block includes a central jaw portion provided with gripping teeth adapted to lockably engage the webbing upon selective rotation of the lock-out block.

5 Claims, 5 Drawing Figures

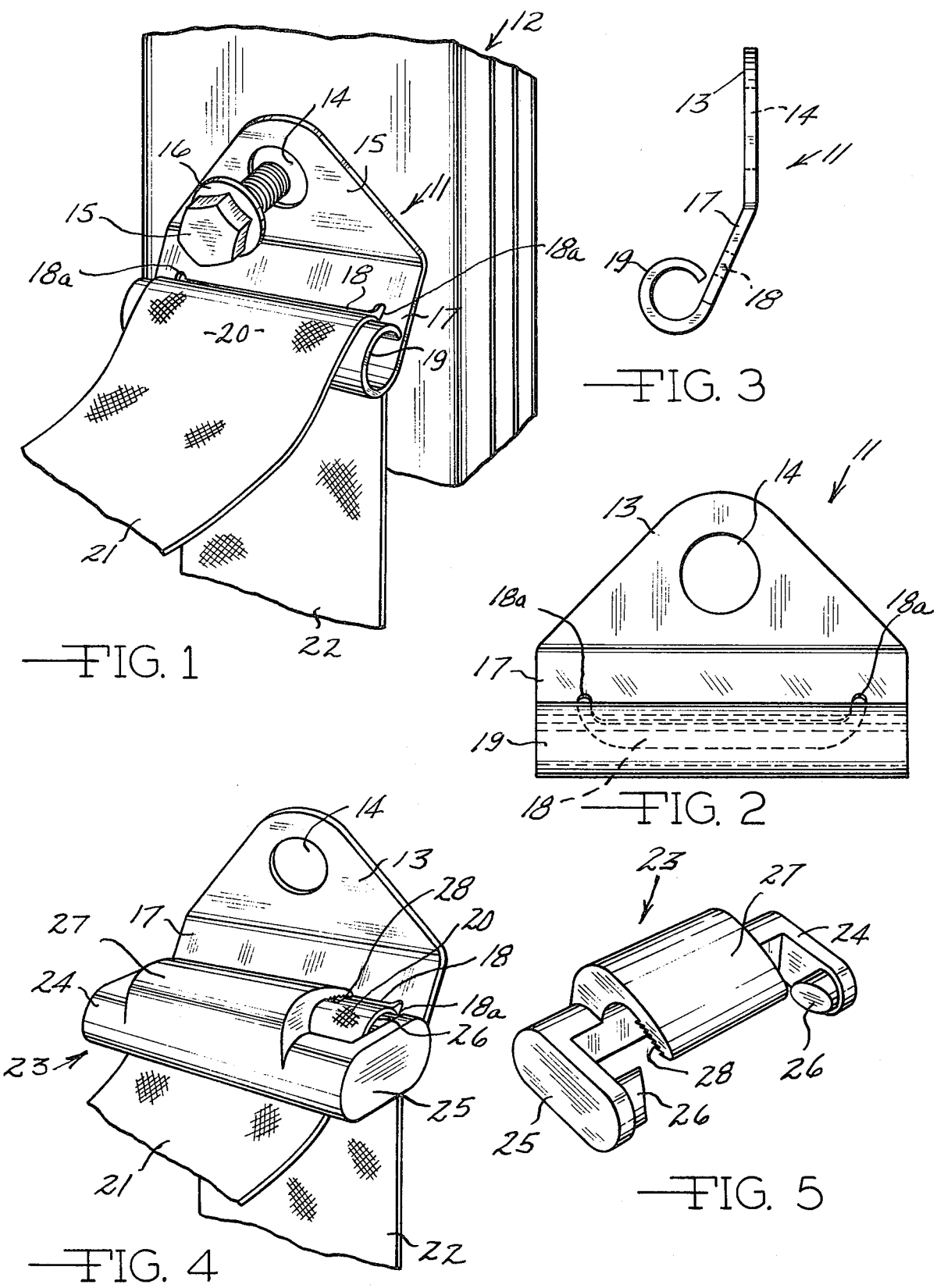

LOW FRICTION GUIDE LOOP

This invention relates to an integrally formed low friction anchor ring guide for use with vertically oriented webbing as used in automotive safety harness and more specifically to an anchor ring having a lower rolled end portion aligned with a webbing slot (transversely through the central portion) so that tangential entrainment of the webbing occurs over the rolled end portion as the webbing passes through the webbing slot. The invention further relates the use of a tension stop lock-out block which is secured to the lower rolled end portion of the anchor ring guide and has a central jaw portion with gripping teeth which lockably engage the webbing upon selective rotation of the lock-out block in response to corresponding lifting movement of the webbing by the user. The tension lock-out eliminates the retractor spring tension from being felt by the user.

The anchor ring devices of the prior known art are provided with locking means to act against tension from the user's side. Such locking means generally consist of a sliding bar member acting against a transverse fixed barrier. Nowhere in the prior art devices are there shown any anchor plate devices having a rolled end portion for entrainment of the webbing thereover and/or provided with pivotally mounted tension lock-out stop means. Examples of such prior art devices are seen in the United States Letters Patent to Fisher, U.S. Pat. No. 3,725,982; to Harmon, U.S. Pat. No. 3,561,070; Joyce, U.S. Pat. No. 3,230,008 and in British Pat. No. 1,287,698.

A need has herefore existed for a seat belt system whereby a small amount of slack is maintained in the shoulder harness webbing so that the wearer will not feel tension on his torso normally caused by the retractor rewind spring while not interfering with the lock-up of the webbing upon sudden stops or deceleration.

It is therefore an object of this invention to provide a low friction anchor ring guide adapted for use on an automobile door post or adjacent the ceiling line where webbing is intended to run up and down to, for example, retractors, floor anchors or the like.

Another object of this invention is to provide an integrally formed low friction anchor ring guide having a rolled end portion in alignment with a webbing slot so that tangential entrainment of the webbing occurs thereon as the webbing passes through the slot so as to assure smooth transition movement and directional translation in adjustment and extension of webbing to the user.

A still further object of this invention is to provide a low friction anchor ring guide provided with pivotally secured tension stop means which is selectively engageable with the seat belt webbing by the user so as to place slack in the webbing on the wearer's side by locking out the tension of the retractor mechanism when desired.

Other objects will be apparent to those skilled in the art upon reading the present description, drawings and claims.

IN THE DRAWINGS

FIG. 1 is a perspective view of the anchor ring guide mounted on an automobile door post with a seat belt entrained over the lower rolled end portion thereof and passing through the webbing slot provided therethrough.

FIG. 2 is a front view of the anchor ring guide showing the lower rolled end portion in alignment with the webbing slot shown in phantom line.

FIG. 3 is a side elevation view of the structure in FIG. 2.

FIG. 4 is a perspective view of a modified anchor ring guide showing the pivotally mounted tension stop mounted thereon in selective engagement with the seat belt webbing.

FIG. 5 is a perspective view of the tension stop showing the central jaw portion provided with gripping teeth on the lower surface thereof.

DESCRIPTION OF A PREFERRED EMBODIMENT

As shown in FIG. 1, the one piece anchor ring member 11 is shown in its operative use position on an automobile door post 12. Normally, the ring member 11 is at or above the head of the seated user on the door post 12. The anchor guide ring member 11 consists of an upper flat triangular tab portion 13 which is provided with an anchor bolt opening 14 therethrough. For purposes of clarity, the anchor bolt 15 and washer 16 are shown in an exploded position away from the door post 12. The anchor bolt 15 fastens the anchor ring guide 11 in its operative use position on the door post 12. As further shown in FIG. 3, the anchor ring guide 11 has a flat central portion 17 which is transversely bent so as to extend away from the door post 12 upon which the guide 11 is mounted. An elongate web-receiving slot 18 is provided through the central portion 17. The slot 18 is provided with upwardly curved arcuate "smile" portions 18a at each end thereof. The anchor ring guide 11 is provided with a lower rolled end portion 19 which is in spaced-apart aligned register with the web slot 18 so that the seat belt 20 is entrained thereover as it passes through the slot 18.

For purposes of discussion, the belt or webbing 20 will be further designated to include the portion 21 thereof which passes over the torso of the user and the portion 22 thereof which leads directly to the retractor mechanism or collateral hardware (not shown).

As shown in FIGS. 4 and 5, another embodiment of the anchor ring guide 11 has a tension block lock member 23 pivotally mounted thereon. The tension lock member 23 has a pair of spaced-apart pivot arms 24 and 25 provided with inwardly extending ramped boss members 26. The ramped boss members 26 are adapted to make snap engagement into the open ends of the rolled end portion 19 of the anchor ring guide 11. Hence, the ramped members 26 may be spring loaded or be made from deformable resin stock which springs into the axial opening formed by the rolled end portions 19 of the guide 11. Thus mounted, the tension block lock member 23 is adapted for selective pivotal movement about the axis of the rolled end portion 19 in response to selected movement of the seat belt web 20 as will be hereinafter described.

As further shown in FIGS. 4 and 5 of the drawings, the tension block lock member 23 is provided with a central jaw member 27 which extends inwardly toward the anchor ring guide 11 upon which it is pivotally mounted. The central jaw member 27 is provided with gripping teeth 28 which extend along the bottom surface of the outer end portion of the central jaw member 27. The gripping teeth 28 are adapted to lockably engage the seat belt webbing 20 when the tension stop block lock member 23 is rotated toward the anchor ring guide 11 so that the central jaw member 27 is pulled by the webbing 20 toward the cylindrical surface of the anchor ring guide 11 and in prevention of retraction of the seat belt webbing 20. Such an arrangement does not interfere with the locking of the webbing 20 against extension which occurs upon sudden deceleration or stopping.

OPERATION

In operation, the anchor ring guide 11 is mounted on an automobile door post 12 as shown in FIG. 1. The seat belt web 20 is passed through the slot 18 provided therein. As further shown in FIG. 1, the web 20 is entrained over the rolled end portion 19 so that portion 21 of the web 20 passes over the torso of the user to make selective connection with (for example) a seat belt buckle (not shown). Portion 22 of the web 20 leads downwardly to the retractor mechanism (not shown).

As shown in FIGS. 4 and 5, the tension block lock member 23 is provided on the anchor ring guide 11 so as to make selective engagement with the seat belt web 20 entrained over the rolled end portion 19. Normally, the tension stop lock member 23 does not inhibit movement of the web 20 through the anchor ring guide 11. The tension stop member 23 can be selectively engaged by the user when the seat belt wearer lifts up the webbing 20 to cause the tension stop 23 to rotate so that the jaw 27 thereof clamps onto the webbing 20. This causes the gripping teeth 28 to lockably and unidirectionally engage the belt web 20. As the teeth 28 engage the webbing 20 under retraction tension, the jaw 27 closes compressionally on the rolled portion 19 of the ring guide 11. This action places slack in the belt web 20 on the wearer's side and selectively locks out or checks the tensioning action of the retractor mechanism until release is desired. Release is easily accomplished by pulling the webbing 20 toward the wearer and downwardly thereby releasing the grip of the teeth 28 on the webbing 20.

From this presentation of the operative embodiment of my invention, improvements, modifications and substitutions will become apparent to those skilled in the art. Such improvements, modifications and substitutions are intended to be included within the spirit of the invention limited only by the scope of the hereinafter appended claims.

I claim:
1. A low friction guide loop comprising:
an integrally formed anchor plate ring guide member having a flat anchor tab upper end portion, a transversely bent central portion provided with an elongate webbing slot therethrough, and a lower rolled end portion in spaced-apart alignment with said webbing slot so that seat belt webbing passing through said slot is entrained over said rolled end portion, said lower rolled end portion rolled upwardly toward said upper end portion, said lower rolled end portion terminating proximate to and in spaced-apart register with said elongate webbing slot.

2. The anchor ring guide member of claim 1 wherein an anchor bolt hole is provided through the anchor tab upper end portion and said anchor tab is triangularly configured.

3. The anchor ring guide member of claim 1 wherein the webbing slot is provided with upwardly curved arcuate end portions.

4. A low friction guide loop assembly and tension lock-out comprising:
a. an integrally formed anchor ring guide member having a flat anchor tab upper end portion, a transversely bent central portion provided with an elongate webbing slot therethrough and a lower rolled end portion in spaced-apart alignment with said webbing slot so that seat belt webbing passing through said slot is entrained over said rolled end portion; and
b. a tension block lock member pivotally mounted on said lower rolled end portion, said tension block lock member provided with a central gripping jaw portion adapted to make locking engagement with seat belt webbing entrained over said rolled end portion when selectively rotated about the axis formed by said rolled end portion toward said anchor ring guide and clamping on said webbing.

5. The low friction guide loop assembly of claim 4 wherein the bottom surface of said gripping jaw portion is provided with gripping teeth which lockably engage seat belt webbing entrained over said rolled end portion.

* * * * *